United States Patent
Ghotra et al.

(10) Patent No.: US 9,282,756 B2
(45) Date of Patent: Mar. 15, 2016

(54) HIGH TEMPERATURE METHODS OF STEEPING GRAIN

(71) Applicants: Baljit Ghotra, Bridgewater, NJ (US); Robert A. Skorge, Somerville, NJ (US); Marc D. Gunderson, Indianapolis, IN (US); Barry J. Nagle, Carmel, IN (US); Vincent R. Green, Easton, PA (US)

(72) Inventors: Baljit Ghotra, Bridgewater, NJ (US); Robert A. Skorge, Somerville, NJ (US); Marc D. Gunderson, Indianapolis, IN (US); Barry J. Nagle, Carmel, IN (US); Vincent R. Green, Easton, PA (US)

(73) Assignee: Corn Products Development, Inc, Sao Paulo (BR)

(*) Notice: Subject to any disclaimer, the term of this patent is extended or adjusted under 35 U.S.C. 154(b) by 769 days.

(21) Appl. No.: 13/625,006

(22) Filed: Sep. 24, 2012

(65) Prior Publication Data

US 2014/0083418 A1    Mar. 27, 2014

(51) Int. Cl.
*A23L 1/0522* (2006.01)
*A23L 1/308* (2006.01)
*C08B 30/04* (2006.01)

(52) U.S. Cl.
CPC ............... *A23L 1/0522* (2013.01); *A23L 1/308* (2013.01); *C08B 30/044* (2013.01)

(58) Field of Classification Search
None
See application file for complete search history.

(56) References Cited

U.S. PATENT DOCUMENTS

| | | | |
|---|---|---|---|
| 2,854,339 A | 9/1958 | de Sollimo et al. | |
| 5,593,503 A | 1/1997 | Shi et al. | |
| 6,468,355 B1 | 10/2002 | Thompson et al. | |
| 6,664,389 B1 | 12/2003 | Shi et al. | |
| 7,276,126 B2 | 10/2007 | Nehmer et al. | |
| 2002/0054948 A1 | 5/2002 | McNaught et al. | |
| 2002/0197373 A1* | 12/2002 | Shi et al. | 426/549 |

OTHER PUBLICATIONS

Singh et al., "Effect of Soak Time, Soak Temperature, and Lactic Acid on Germ Recovery Parameters", Cereal Chem. 73(6):716-720, 1996.
Bressani et al. "Changes in Selected Nutrient Contents and in Protein Quality of Common and Quality-Protein Maize During Rural Tortilla Preparation", Cereal Chem. 67(6):515-518, 1990.
Fan et al., "Comparison of the Rates of Absorption of Water by Corn Kernels with and Without Dissolved Sulfur Dioxide", Cereal Chem. 42:385-396, 1965.

* cited by examiner

*Primary Examiner* — Melvin C Mayes
*Assistant Examiner* — Stefanie Cohen
(74) *Attorney, Agent, or Firm* — John Danielwood; Karen G. Kaiser

(57) ABSTRACT

The application relates to a process comprising: a) steeping high amylose corn kernels at a temperature from about 71° C. to about 93° C. for a time from about 24 hours to about 72 hours; b) subjecting the high-temperature steep corn kernels to conventional wet milling; c) recovering starch with a total dietary fiber (TDF) content from about 33% to about 45% (w/w); and d) wherein the recovered starch has not been chemically modified.

9 Claims, 2 Drawing Sheets

HIGH TEMPERATURE METHODS OF STEEPING GRAIN

INTRODUCTION

Fiber is an important nutritional component of the human diet. Currently, nutritionists generally recommend the consumption of at least 25 grams per day of fiber. Such levels of fiber may contribute to gut health, heart health, cancer prevention, and avoidance of other health problems. However, it is estimated that in the average diet in the industrialized world, only about 10 grams per day of fiber is consumed. Therefore, providing high-fiber foods which are appealing to consumers is desired. Dietary fiber consists of the remnants of plant cells, polysaccharides, lignin, and associated substances resistant to hydrolysis (digestion) by the alimentary enzymes of humans.

In recent years, there has been increased awareness of the role of total dietary fiber (TDF) in human diet. Ingredion Incorporated has technologies to increase TDF in starch products such as NOVELOSE® 330 starch (a $RS_3$-type resistant, nongranular, retrograded starch) and HI-MAIZE® 260 starch (a resistant starch derived from high amylose cornstarch), with 30% and 60% TDF contents, respectively. Haralampu et al. in U.S. Pat. No. 5,849,090 provided a method of heating an aqueous slurry of a granular native starch to a temperature sufficient to swell the native starch granules without disrupting the starch granules. The swelled granular native starch is then treated with a debranching enzyme to give a starch with a TDF content from about 20% to about 50% by weight.

Thompson et al. in U.S. Pat. No. 6,468,355 disclosed a method of subjecting a starch to acid hydrolysis, followed by heat-moisture treatment to give a product which is over 60% TDF. Nehmer et al. in U.S. Pat. No. 7,276,126 described an process of extruding a starch at a temperature in the range of about 60° C. to 220° C. followed by heat-moisture treatment to give starches with as high as 61% TDF. Unlike these techniques, the current application does not require secondary processing such as additional heating, and/or acid treatment, and/or enzyme treatments/hydrothermal treatments, which adds a significant cost to the final product. So, there is a need of a simple, low-cost method for producing starch with increased TDF content.

The method of wet milling is very well documented in the literature. In conventional wet milling, corn is steeped, i.e. soaked in 0.1% to 0.4% aqueous sulfur dioxide solution, at 40° C. to 55° C. for 28 hours to 72 hours. In water, the sodium dioxide forms sulfurous acid, which controls fermentation and softens the corn kernel. Steeping of corn aids in the separation the various components of corn such as starch and nutrients. The softened corn is then separated by various mechanical wet milling operations into starch, protein, germ, and fiber.

A number of publications and patents have claimed improvements in the wet milling process with the goal of extracting starch products with improved physical/chemical properties of starch/other components of corn. Singh et al., "Effect of Soak Time, Soak Temperature, and Lactic Acid on Germ Recovery Parameters", Cereal Chem. 73(6):716-720, 1996, reported steeping yellow dent corn at 75° C. in an experimental wet-milling process and stated, "effects of starch gelatinization could be observed". During the nixtamalization process to make masa, kernels of dried corn are cooked in an alkaline limewater solution at or near the mixture's boiling point. After cooking, the corn is steeped in the cooking liquid for a period. As Bressani et al. "Changes in Selected Nutrient Contents and in Protein Quality of Common and Quality-Protein Maize During Rural Tortilla Preparation", Cereal Chem. 67(6):515-518, 1990 showed, the TDF decreases from about 13% to about 10% on a dry weight basis in the masa during the process.

de Sollimo et al. in U.S. Pat. No. 2,854,339 claimed a method, "comprising: steeping whole corn in water of generally neutral pH in the temperature range of 68° C. to 82° C. for two hours to one-half hour". This makes corn meal with improved shelf life toward rancidity because, "[t]he natural enzymes of the grains are debilitated in the steeping step." Fan et al., "Comparison of the Rates of Absorption of Water by Corn Kernels with and Without Dissolved Sulfur Dioxide", Cereal Chem. 42:385-396, 1965 measured the effects of time, temperature, and $SO_2$ concentration on water absorption rates during corn steeping using sweet, pop, and dent corn including temperatures of 71° C.

Shi et al. in U.S. Pat. No. 5,593,503 taught heat-moisture treatment of HYLON® VII starch (an unmodified high amylose corn starch which contains approximately 70% amylose), at a moisture level of 37.4% and with an initial TDF content of 12.0%, gave a starch containing 41.9% TDF. Similar heat-moisture treatment of VJR starch, which has a high molecular weight amylose content of 78.3% and a low molecular weight amylose content of 18.7%, gave a starch containing 42.3% TDF.

SUMMARY

In one aspect the application provides a process comprising:
a) steeping high amylose corn kernels at a temperature from about 71° C. to about 93° C. for a time from about 24 hours to about 72 hours;
b) subjecting the high-temperature steep corn kernels to conventional wet milling;
c) recovering starch with a total dietary fiber (TDF) content from about 33% to about 45% (w/w).

DETAILED DESCRIPTION

Figure 1:
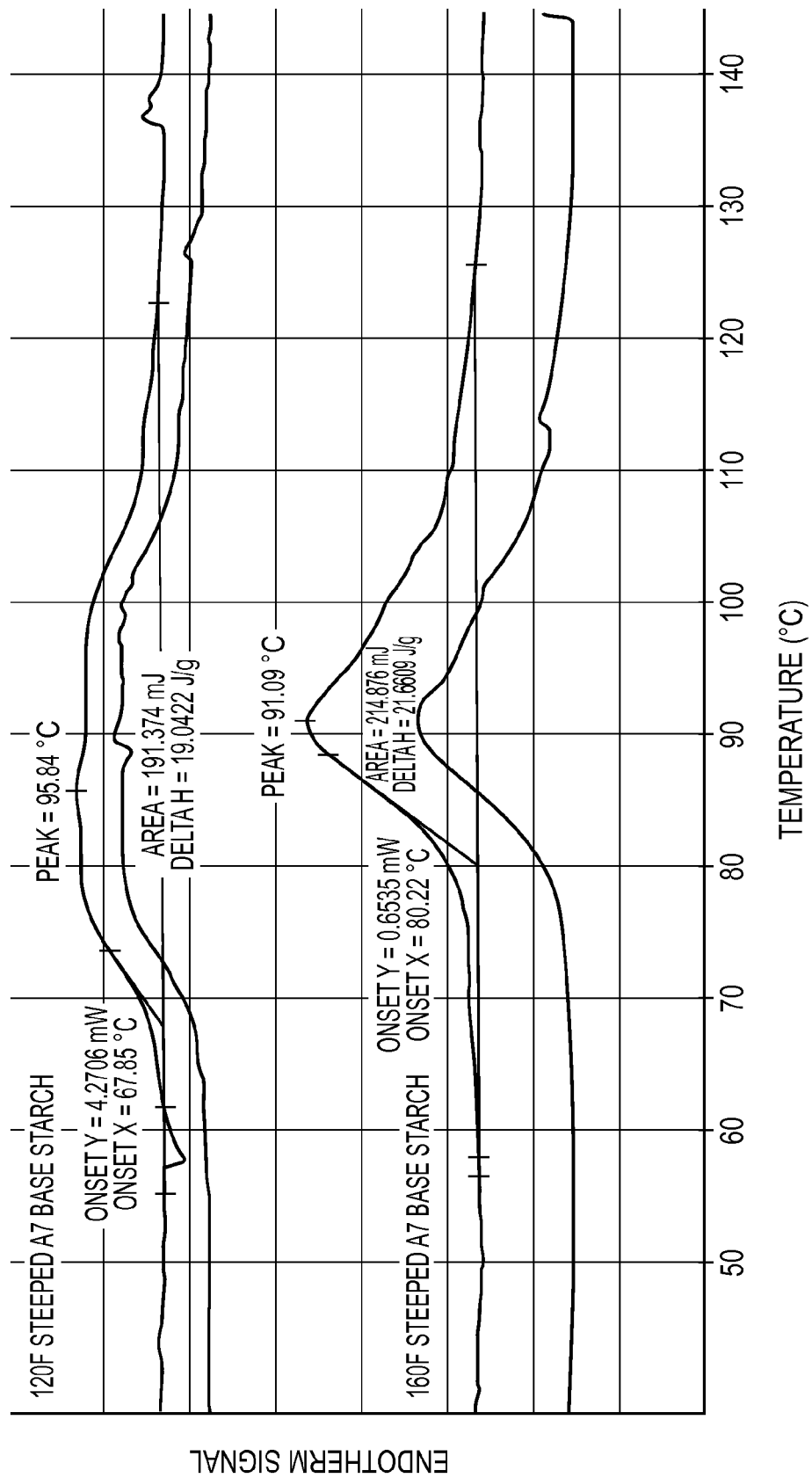
FIG. 1 depicts the thermal properties of the starch product obtained by the high temperature steeping process of the present application.

In one aspect the application provides a process comprising:
a) steeping high amylose corn kernels at a temperature from about 71° C. to about 93° C. for a time from about 24 hours to about 72 hours;
b) subjecting the high-temperature steep corn kernels to conventional wet milling;
c) recovering starch with a total dietary fiber (TDF) content from about 33% to about 45% (w/w).
In one embodiment the recovered starch has not been chemically modified.
In one embodiment the steeping process is done in two stages.
In another embodiment the two stage steeping process is done first at a temperature from about 71° C. to about 76° C. for a time from about 14 hours to about 26 hours and done secondly at a temperature from about 76° C. to about 88° C. for a time from about 14 hours to about 26 hours.
In another embodiment the two stage steeping process is done first at a temperature from about 71° C. to about 73° C. for a time from about 17 hours to about 23 hours and done secondly at a temperature from about 79° C. to about 85° C. for a time from about 17 hours to about 23 hours.

In another embodiment the two stage steeping process is done first at a temperature of about 71° C. for a time of about 20 hours and done secondly at a temperature of about 82° C. for a time of about 20 hours.

In one embodiment the steeping process is done in one stage.

In another embodiment the one stage steeping process is done at a temperature from about 71° C. to about 76° C. for a time from about 24 hours to about 36 hours.

In another embodiment the one stage steeping process is done at a temperature from about 71° C. to about 73° C. for a time from about 27 hours to about 33 hours.

In another embodiment the one stage steeping process is done at a temperature of about 71° C. for a time of about 30 hours.

The present application proposes high temperature steeping of corn kernels, especially high amylose varieties, at temperatures ranging from 71° C. to 93° C. for 24 hours to 72 hours. The high temperature steeped starch kernels are subjected to conventional wet milling process to recover starch. The extracted starch shows increased TDF content, ranging from 33% to 45% as compared to conventional wet milling process, which showed a TDF of 20% to 25% in starch (Table 1). The process has no negative impact on the recovery and quality of extracted starch. The present application teaches a simple and economical method of cost effective starch extraction yielding starch with high TDF values that is highly desirable for nutritional applications.

Furthermore, the starch product obtained after the high temperature steeping process when cooked at 95° C. in excess water showed less viscosity development as compared to control (Table 2). Both delayed melting and lower viscosity development are highly desirable properties of starch as valued in many food and industrial applications.

TABLE 2

Viscosity and color measurement of starch prepared from high temperature steeped corn

| corn | Steeping Description | Color (Hunter L) | Viscosity (mPas) |
| --- | --- | --- | --- |
| A7 | One step steeping at 57 C. for 30 h → wet milling → dried starch | 94.3 | 73 |
| A7 | One step steeping at 71 C. for 30 h → wet milling → dried starch | 94.2 | 55 |

TABLE 1

TDF summary of the steeping experiments

| corn | Steeping Description | TDF (%, db) |
| --- | --- | --- |
| A7 | One step steeping at 49 C. for 30 h → wet milling → dried starch | 20.4 |
| A7 | One step steeping at 57 C. for 30 h → wet milling → dried starch | 22.4 |
| A7 | One step steeping at 71 C. for 30 h → wet milling → dried starch | 31.1 |
| A7 | One step steeping at 71 C. for 30 h → wet milling → dried starch | 29.6 |
| A7 | One step steeping at 77 C. for 30 h → wet milling → dried starch | 38.5 |
| A7 | Two step steeping at 71 C. for 20 h and 82 C. for 20 h → wet milling → dried starch | 35.4 |
| A7 | Four step steeping w/o quenching 60 C.→71 C → 82 C for 64 h → 93 C 20 h at 93 C. → wet milling → dried starch | 45.2 |
| A8 | One step steeping at 60 C. for 30 h → wet milling → dried starch | 29.1 |
| A8 | One step steeping at 71 C. for 30 h → wet milling → dried starch | 36.4 |
| A8 | One step steeping at 82 C. for 30 h → wet milling → dried starch | 43.9 |
| A8 | Two step steeping at 71 C. for 20 h and 82 C. for 20 h → wet milling → dried starch | 43.4 |
| A8 | Four step steeping w/o quenching 60 C.→71 C. → 82 C. for 64 h → 93 C. 20 h at 93 C. → wet milling → dried starch | 45.2 |

The starch product obtained by the high temperature steeping process of the present application also showed improved thermal properties in the starch as evident by the delayed onset and peak melting shown in FIG. 1.

A comparison of the TDF content of the final starch made by the one step process shows a correlation to the amylose content of the starting corn (Table 3).

TABLE 3

Effect of amylose content of corn and comparison of heat-moisture treatment with high temperature steeping on TDF and color of final starch

| Corn | Steeping Description | Water uptake (%) | TDF (%, db) | Hunter color (L value) |
| --- | --- | --- | --- | --- |
| Dent[1] | One step steeping at 71 C. for 40 h → wet milling → dried starch | 55 | 2 | 89 |
| A5[2] | One step steeping at 71 C. for 40 h → wet milling → dried starch | 76 | 13 | 89 |
| A7[3] | One step steeping at 71 C. for 40 h → wet milling → dried starch | 75 | 36 | 87 |
| A8[4] | One step steeping at 71 C. for 40 h → wet milling → dried starch | 85 | 47 | 88 |
| A7 | One step steeping at 49 C. for 30 h → wet milling → dried starch | ND | 20 | ND |

TABLE 3-continued

Effect of amylose content of corn and comparison of heat-moisture treatment with high temperature steeping on TDF and color of final starch

| Corn | Steeping Description | Water uptake (%) | TDF (%, db) | Hunter color (L value) |
|---|---|---|---|---|
| A7 | One step steeping at 57 C. for 30 h → wet milling → dried starch | ND | 22 | ND |
| A7 | Adjust moisture of grain to 45% and heat-moisture treatment at 80 C. for 16 hr | 44 | 36 | 83 |
| A7 | Two step steeping at 71 C. for 20 h and 82 C. for 20 h → wet milling → dried starch | 83 | 46 | 87 |

[1]25% amylose
[2]50% amylose
[3]70% amylose
[4]80% amylose

Figure 2:
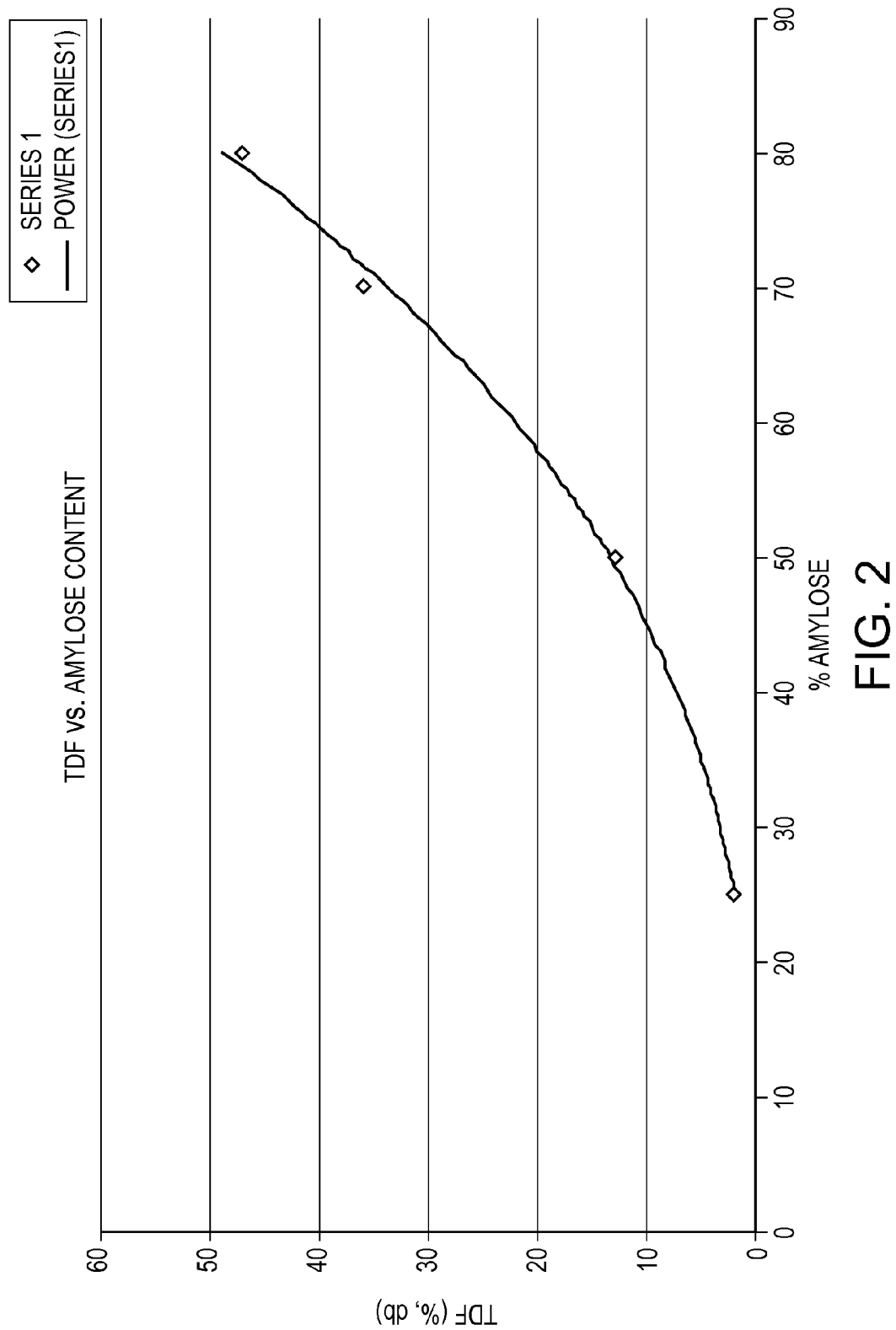
FIG. 2 depicts the comparison of the TDF content of the final starch made by the one step process to the amylose content of the starting corn.

As can bee seen in FIG. 2, this relationship is non-linear, i.e. unpredictable, and is best fitted as a power law relationship. A comparison of the increase in TDF and the Hunter color, i.e. the whiteness, of starch made from the same starting corn by the conventional wet milling process, by the present two step high temperature steeping process, and by heat-moisture treatment shows an unexpected greater increase in TDF for the present two step process. Also unexpected is the better color of the two step process compared with the heat-moisture treatment process.

DEFINITIONS

The following definitions are used in connection with the compounds of the present application unless the context indicates otherwise. The phrase "chemically modified starch", as used herein, is intended to mean chemically modified via a reagent. Chemical modifications include acid-conversion, phosphorylation, etherification, esterification, chemical crosslinking, conventional enzyme modification, or the like. Procedures for modifying starches are described in "Starch and Its Modification" by M. W. Rutenberg, pages 22-26 to 22-47, "Handbook of Water Soluble Gums and Resins", edited by R. L. Davidson, 1980, and "Starch: Chemistry and Technology, Third Edition", edited by James BeMiller and Roy Whistler, Chapter 17, 2009.

The phrase "high amylose", as used herein, means containing at least 27% amylose for wheat or rice and at least 50% amylose for other sources and, for sources other than wheat or rice, in one embodiment contains at least 70%, in another embodiment particularly at least 80%, and in yet another embodiment at least 90% amylose by weight based on the starch within the whole grain. The percent amylose is determined by using the potentiometer test described, infra.

The phrase "total dietary fiber" content ("TDF"), as used herein, may include the polysaccharides and remnants of plant materials that are resistant to hydrolysis (digestion) by human alimentary enzymes, including nonstarch polysaccharides, resistant starch, lignin, and minor components such as waxes, cutin, and suberin. The acronym "TDF", as used herein, is defined as measured by the weight of undigested material separated by filtration as described by the test described as AOAC method 991.43.

The word "steeping", as used herein, means harvested maize kernels are cleaned and then soaked in 0.1% to 0.4% aqueous sulfur dioxide solution. In the process the moisture content of the maize kernels increases from about 15% to about 45% and their volume more than doubles. The gluten bonds in the maize kernels are weakened and starch is released. The maize kernels are then ground to break free the germ and other components.

Certain specific aspects and embodiments of the present application will be explained in greater detail with reference to the following examples, which are provided only for purposes of illustration and should not be construed as limiting the scope of the application in any manner. Reasonable variations of the described procedures are intended to be within the scope of the present invention. While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES

The Following Test Procedures were Used Throughout the Examples. Total Dietary Fiber Determination ("TDF") Using AOAC 991.43 Method.

Total dietary fiber (TDF) was determined using the Megazyme-K-TDFR diagnostic kit recommended for AOAC Official Method 991.43. Duplicate samples (1.0 g dry basis) were dispersed in 0.05M MES/TRIS buffer solution (40 mL, pH 8.2) in 400 mL tall-form beaker and a heat stable alpha-amylase solution (50μ.L) was added. The mixture was incubated in the shaking water bath at 98 C for 35 minutes. After cooling to 60 C, the mixture was treated with protease enzyme (100 μL) and incubated for 30 minutes. The digest was adjusted to pH 4.5 with HCL solution. Then glucoamylase (200 μL) was added and the mixture was digested for another 30 minutes at 60° C. An insoluble residue was precipitated by adding 4 volumes of 95% ethanol. The residue was collected on packed filter, dried overnight at 105° C., weighed, and calculated as total dietary fiber (minus the protein and ash contents in residue). All TDF data reported on dry basis.

Amylose Content.

Amylose content could be determined by potentiometric titration. Approximately 0.5 g of a starch sample is heated in 10 mL of concentrated calcium chloride (about 30% by weight) to 95° C. for 30 minutes. The sample is cooled to room temperature, diluted with 5 mL of a 2.5% uranyl acetate solution, mixed well, and centrifuged for 5 minutes at 2000 rpm. The sample is then filtered to give a clear solution. The starch concentration is determined by polarimetry using a 1 cm polarimetric cell. An aliquot of the sample (normally 5 mL) is then directly titrated with a standardized 0.01 N iodine solution while recording the potential using a platinum electrode with a KCl reference electrode. The amount of iodine needed to reach the inflection point was measured directly as bound iodine. The amount of amylose was calculated by assuming 1.0 gram of amylose will bind with 200 mg of iodine.

Hunter L Color.

The Hunter Colorimeter can be used to measure a multitude of color scales and optical properties of a dry powder sample of starch. A Hunter Color QUEST spectrocolorimeter sphere model (commercially available from Hunter Associates Laboratory, Inc., Reston, Va.) equipped with an NIR compression cell with quartz window (commercially available from Bran-Luebbe, Inc., Buffalo Grove, Ill.) is used to measure color according to the manufacture's instructions using the following parameters: Scale=b (yellow), Observer angle=10, Illuminant=D65, Reflectance setting=RSIN, Viewing area Size=LAV and Ultraviolet Filter=out.

Throughout this application, various publications are referenced. The disclosures of these publications in their entireties are hereby incorporated by reference into this application in order to more fully describe the state of the art as known to those skilled therein as of the date of the application described and claimed herein.

While particular embodiments of the present application have been illustrated and described, it would be obvious to those skilled in the art that various other changes and modifications can be made without departing from the spirit and scope of the application. It is therefore intended to cover in the appended claims all such changes and modifications that are within the scope of this application.

We claim:

1. A process comprising:
   a) steeping high amylose corn kernels at a temperature from about 71° C. to about 93° C. for a time from about 24 hours to about 72 hours;
   b) subjecting the high-temperature steep corn kernels to conventional wet milling;
   c) recovering starch with a total dietary fiber (TDF) content from about 33% to about 45% (w/w).

2. The process of claim 1, wherein the steeping process is done in two stages.

3. The process of claim 2, wherein the two stage steeping process is done first at a temperature from about 71° C. to about 76° C. for a time from about 14 hours to about 26 hours and done secondly at a temperature from about 76° C. to about 88° C. for a time from about 14 hours to about 26 hours.

4. The process of claim 3, wherein the two stage steeping process is done first at a temperature from about 71° C. to about 73° C. for a time from about 17 hours to about 23 hours and done secondly at a temperature from about 79° C. to about 85° C. for a time from about 17 hours to about 23 hours.

5. The process of claim 4, wherein the two stage steeping process is done first at a temperature of about 71° C. for time of about 20 hours and done secondly at a temperature of about 82° C. for a time of about 20 hours.

6. The process of claim 1, wherein the steeping process is done in one stage.

7. The process of claim 6, wherein the one stage steeping process is done at a temperature from about 71° C. to about 76° C. for a time from about 24 hours to about 36 hours.

8. The process of claim 7, wherein the one stage steeping process is done at a temperature from about 710 C to about 730 C for a time from about 27 hours to about 33 hours.

9. The process of claim 8, wherein the one stage steeping process is done at a temperature of about 71° C., for a time of about 30 hours.

* * * * *